United States Patent [19]

Oda

[11] Patent Number: 5,515,988
[45] Date of Patent: May 14, 1996

[54] BRANCH JOINT BOX

[75] Inventor: Akihiro Oda, Yokkaichi, Japan

[73] Assignee: Sumitomo Wiring Systems, Ltd., Yokkaichi, Japan

[21] Appl. No.: 254,542

[22] Filed: Jun. 6, 1994

[30] Foreign Application Priority Data

Jun. 22, 1993 [JP] Japan ................................ 5-033537 U

[51] Int. Cl.⁶ .................................................. H02G 3/08
[52] U.S. Cl. .......................... 220/38; 220/3.94; 220/4.21; 220/307
[58] Field of Search ........................... 220/3.8, 3.2, 3.92, 220/3.94, 4.21, 4.24, 306, 307

[56] References Cited

U.S. PATENT DOCUMENTS

| | | | |
|---|---|---|---|
| 3,075,627 | 1/1963 | Kuckoff | 220/4.21 |
| 3,912,106 | 10/1975 | Traupe | 220/3.94 |
| 4,706,808 | 11/1987 | Guestersloh | 220/4.21 |
| 4,896,784 | 1/1990 | Heath | 220/3.8 |
| 4,905,861 | 3/1990 | Boxall et al. | 220/306 |
| 5,370,551 | 12/1994 | Data | 220/3.8 |
| 5,405,035 | 4/1995 | Kato | 220/3.8 |
| 5,415,308 | 5/1995 | Oda | 220/306 |
| 5,427,261 | 6/1995 | Naitou | 220/3.8 |

FOREIGN PATENT DOCUMENTS

| | | | |
|---|---|---|---|
| 0409347 | 7/1990 | European Pat. Off. . | |
| 2460855 | 1/1981 | France | 220/4.21 |

Primary Examiner—Stephen J. Castellano
Attorney, Agent, or Firm—Sandler, Greenblum, & Bernstein

[57] ABSTRACT

A branch joint box includes a lower casing and an upper casing. When the upper casing is fitted into the lower casing, a locking projection formed on an inner surface of an outer peripheral wall of the lower casing rides over a locking projection formed on an outer surface of an outer peripheral wall of the upper casing so as to engage the locking projection of the upper casing to lock the upper casing to the lower casing. The branch joint box includes a pair of downwardly extending ribs respectively formed at opposite sides of the locking projection of the upper casing, which have a height identical with the height of the locking projection of the upper casing.

1 Claim, 4 Drawing Sheets

Fig. 2 PRIOR ART
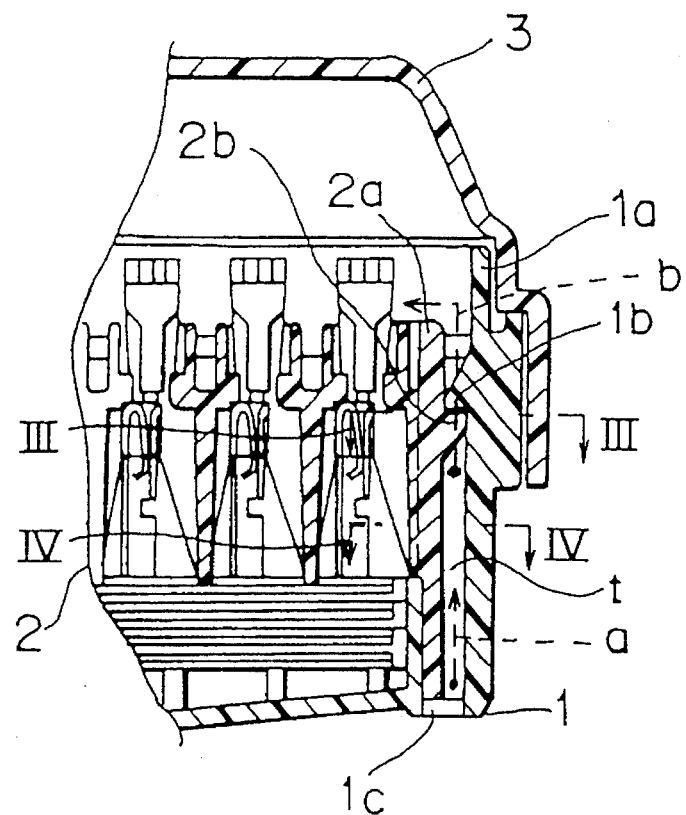
Fig. 3
PRIOR ART
Fig. 4
PRIOR ART
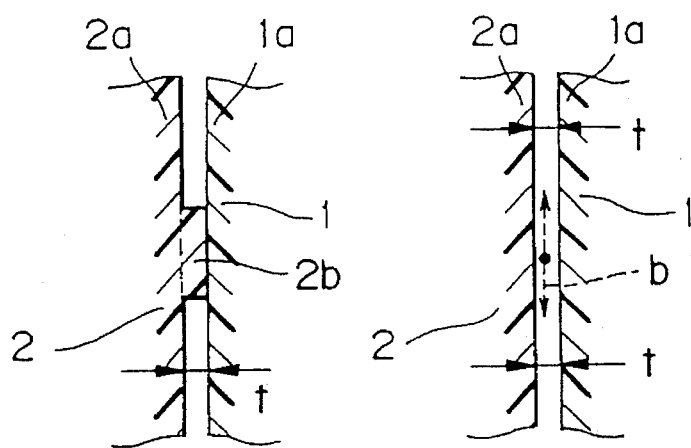

BRANCH JOINT BOX

BACKGROUND OF THE INVENTION

The present invention generally relates to a branch joint box for performing branching of a circuit through branch joint of connectors of a wiring harness, etc. for a motor vehicle and more particularly, to prevention of penetration of water into a casing of the branch joint box.

In a branch joint box used for joining a wiring harness for a motor vehicle to various electrical parts by branching, branch joint points are concentrated at one spot so as to reasonably and economically join a circuit by branching. In response to rise of densities of wires of the wiring harness, various types of branch joint boxes have been developed.

As shown in FIGS. 1 and 2, a known branch joint box includes a lower casing 1 and an upper casing 2. In the known branch joint box, when an outer surface of an outer peripheral wall 2a of the upper casing 2 is fitted into an inner surface of an outer peripheral wall 1a of the lower casing 1, a locking projection 1b formed on the inner surface of the outer peripheral wall 1a of the lower casing 1 is caused to ride over a locking projection 2b formed on the outer surface of the outer peripheral wall 2a of the upper casing 2 so as to be brought into engagement with the locking projection 2b such that the lower and upper casings 1 and 2 are locked to each other. Meanwhile, upper and lower portions of the lower and upper casings 1 and 2 locked to each other as described above are closed by upper and lower covers (not shown), respectively.

Since the branch joint box is provided in an engine compartment of the motor vehicle, countermeasures for preventing penetration of rainwater, etc. into the branch joint box and discharging the penetrated rainwater, etc. from the branch joint box are taken. As one of such countermeasures, a drainage hole 1c for discharging the penetrated rainwater, etc. from the branch joint box is formed on a bottom wall of the lower casing 1.

However, since the drainage hole 1c is formed by utilizing a recessed portion of the lower casing 1 for molding the locking projection 1b, the drainage hole 1c is disposed immediately below the locking projection 1b. Therefore, such a case may happen that rainwater, etc. flow reversely from the drainage hole 1c into a gap t between the lower and upper casing 1 and 2 as shown by the arrow a. At this time, since below the locking projection 2b of the upper casing 2, there is nothing preventing penetration of rainwater, etc. into the branch joint box as shown in FIGS. 3 and 4, the rainwater, etc. may pass by opposite sides of the locking projection 2b from below the locking projection 2b so as to penetrate into the upper casing 2, thereby resulting in immersion of a bus bar, etc. in water.

SUMMARY OF THE INVENTION

Accordingly, an essential object of the present invention is to provide, with a view to eliminating the above mentioned drawbacks inherent in conventional branch joint boxes, a branch joint box in which rainwater, etc. having reversely flown into a lower casing from a drainage hole, etc. are prevented from penetrating into an upper casing.

In order to accomplish this object of the present invention, a branch joint box according to the present invention includes a lower casing and an upper casing, in which when the upper casing is fitted into the lower casing, a locking projection formed on an inner surface of an outer peripheral wall of the lower casing is caused to ride over a locking projection formed on an outer surface of an outer peripheral wall of the upper casing so as to be brought into engagement with the locking projection of the upper casing such that the upper and lower casings are locked to each other, the branch joint box comprising: a pair of downwardly extending ribs which are, respectively, formed at opposite sides of the locking projection of the upper casing so as to have a height identical with that of the locking projection of the upper casing.

In the branch joint box of the present invention, when rainwater, etc. reversely flows from a drainage hole into the lower casing, the ribs formed at the opposite sides of the locking projection of the upper casing prevent the rainwater, etc. from flowing to the opposite sides of the locking projection of the upper casing from a lower portion of the locking projection of the upper casing and thus, penetration of the rainwater, etc. into the upper casing does not take place.

BRIEF DESCRIPTION OF THE DRAWINGS

This object and features of the present invention will become apparent from the following description taken in conjunction with the preferred embodiment thereof with reference to the accompanying drawings, in which:

FIG. 2 is a sectional view of a locking portion of the prior art branch joint box of FIG. 1 (already referred to);

FIG. 3 is a sectional view taken along the line III—III in FIG. 2 (already referred to);

FIG. 4 is a sectional view taken along the line IV—IV in FIG. 2 (already referred to);

Before the description of the present invention proceeds, it is to be noted that like parts are designated by like reference numerals throughout several views of the accompanying drawings.

DETAILED DESCRIPTION OF THE INVENTION

Figure 1:
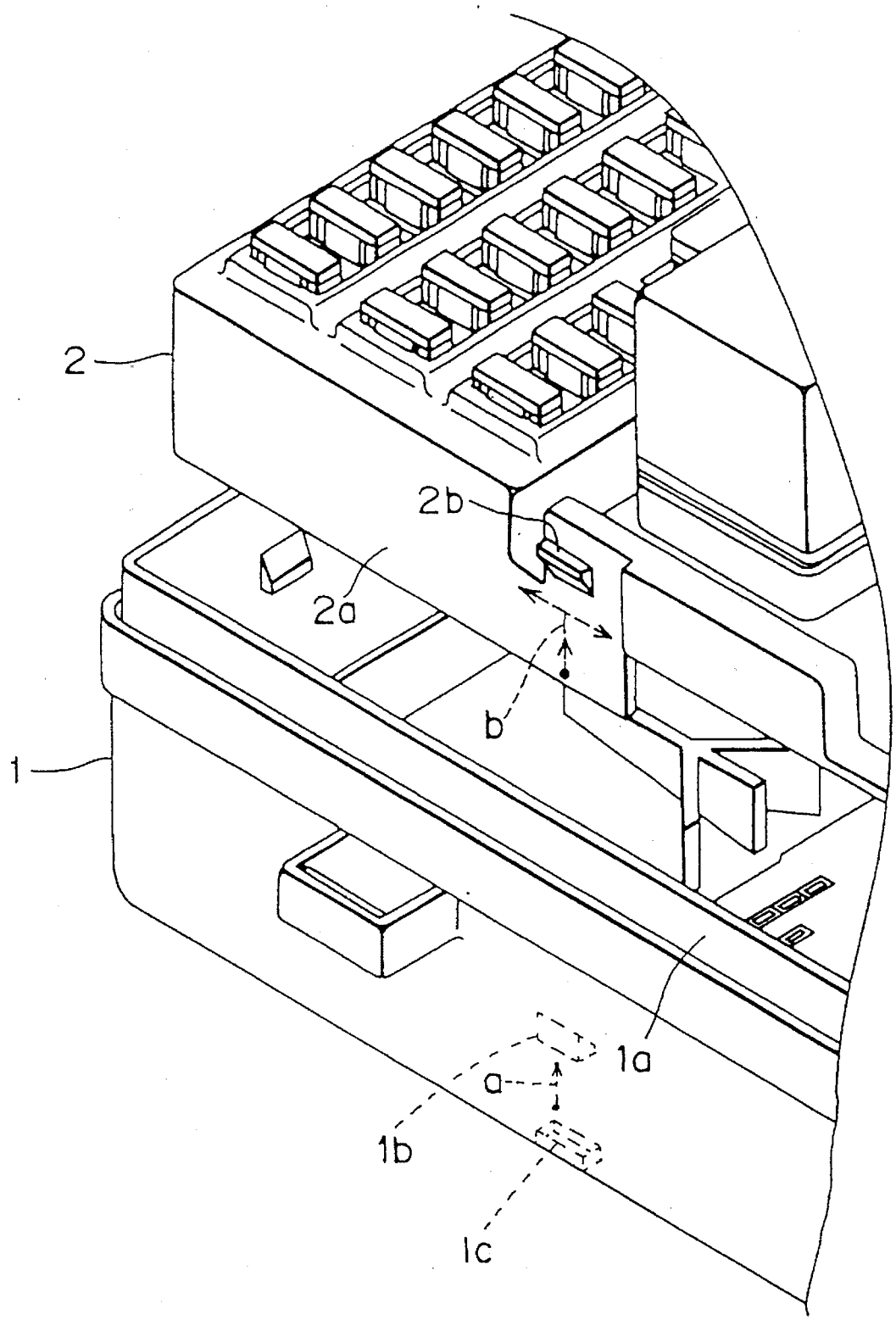
FIG. 1 is an exploded perspective view of a prior art branch joint box (already referred to)
Figure 5:
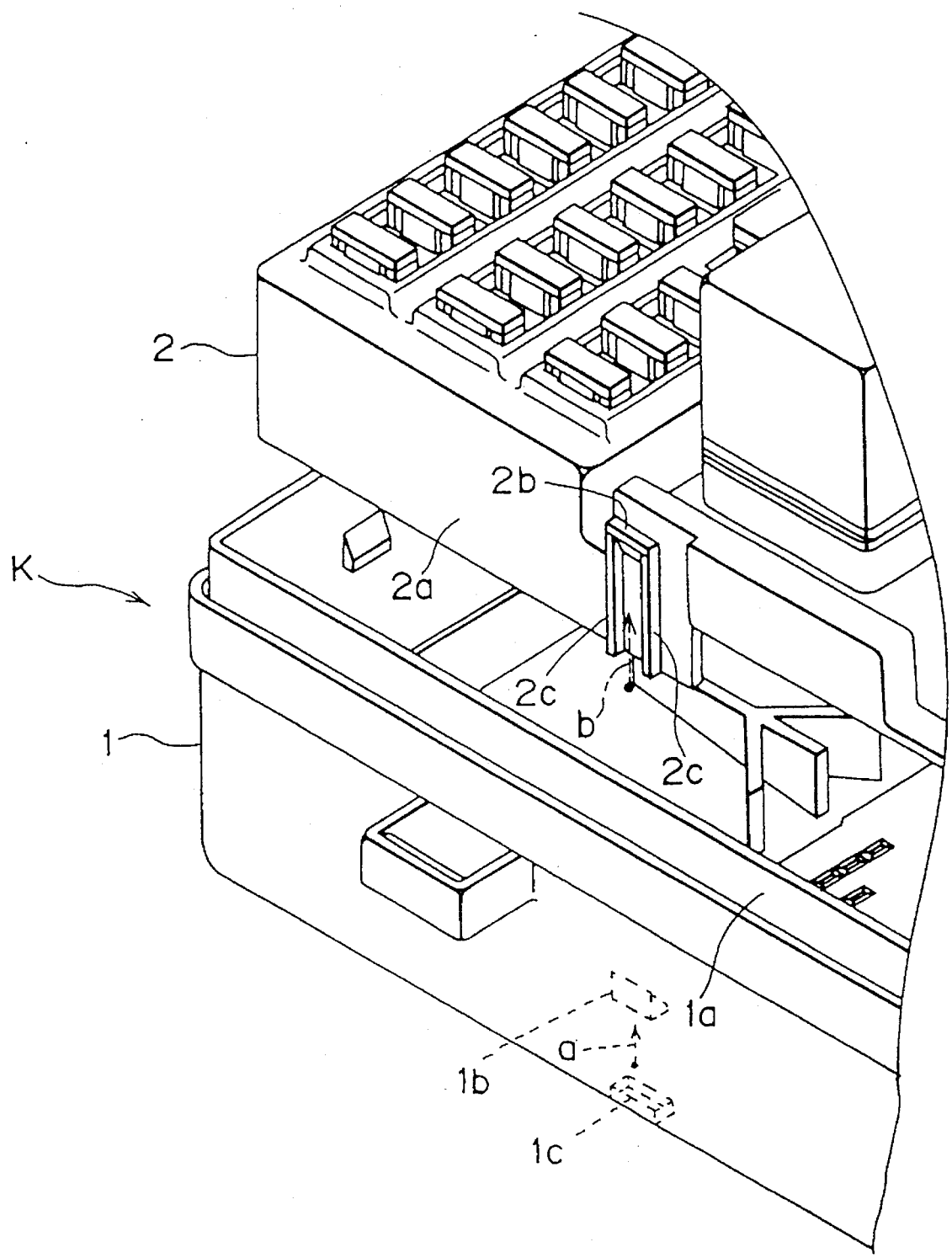
FIG. 5 is an exploded perspective view of a branch joint box according to the present invention.
Figure 6:
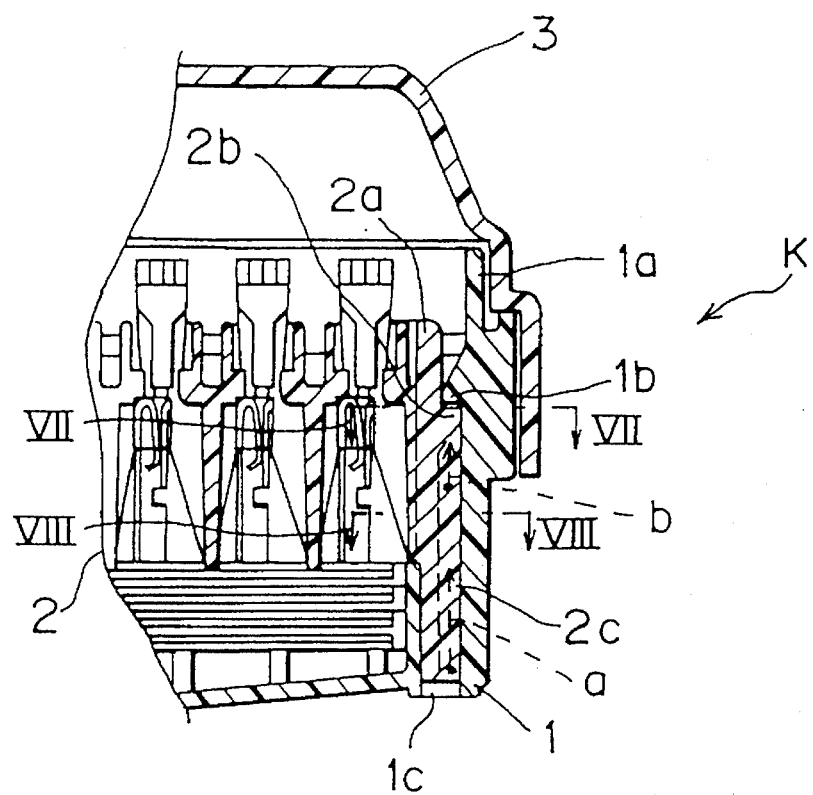
FIG. 6 is a sectional view of a locking portion of the branch joint box of FIG. 5.

Referring now to the drawings, there is shown in FIGS. 5 and 6, a branch joint box K according to one embodiment of the present invention. The branch joint box K includes a lower casing 1 and an upper casing 2. A locking projection 1b is formed at a proper position on an inner surface of an outer peripheral wall 1a of the lower casing 1, while a locking projection 2b engageable with the locking projection 1b is formed at a proper position on an outer surface of an outer peripheral wall 2a of the upper casing 2.

At opposite sides of the locking projection 2b of the upper casing 2, a pair of downwardly extending ribs 2c having a height identical with that of the locking projection 2b, i.e. a thickness identical with a distance of a gap t (FIGS. 7 and 8) between the lower and upper casings 1 and 2 are, respectively, formed integrally with the locking projection 2b. Since the ribs 2c are formed at the opposite sides of the locking projection 2b, the ribs 2c do not hinder locking of the lower and upper casing 1 and 2 through engagement between the locking projections 2b and 1b. Meanwhile, a drainage hole 1c is formed on a bottom wall of the lower casing 1.

When the outer surface of the outer peripheral wall 2a of the upper casing 2 is fitted into the inner surface of the outer peripheral wall 1a of the lower casing 1, the locking projection 1b of the lower casing 1 is caused to ride over the locking projection 2b of the upper casing 2 and thus, is carried to an upper side of the locking projection 2b so as to be brought into engagement with the locking projection 2b such that the lower and upper casings 1 and 2 are locked to each other. After an upper portion of the upper casing 2 has been closed by an upper cover 3 and a lower portion of the lower casing 1 has been closed by a lower cover (not shown), the branch joint box K is provided in an engine compartment, etc. of a motor vehicle.

Figures 7, 8:
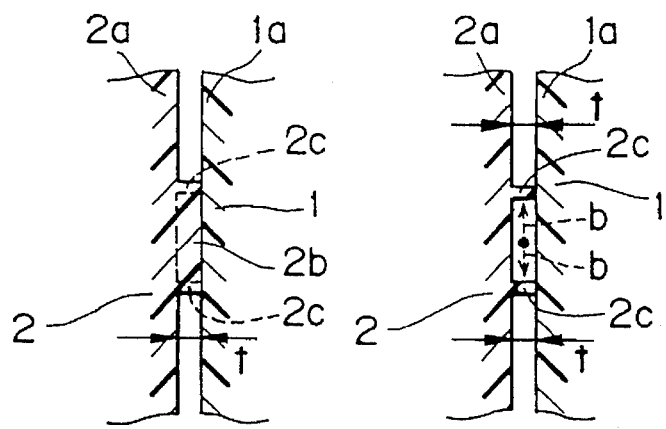
FIG. 7 is a sectional view taken along the line VII—VII in FIG. 6.
FIG. 8 is a sectional view taken along the line VIII—VIII in FIG. 6.

Supposing that rainwater, etc. flows reversely from the drainage hole 1c into the lower casing 1 so as to penetrate into the gap t between the lower and upper casings 1 and 2 as shown by the arrow a, the rainwater, etc. will flow to a lower portion of the locking projection 2b. However, since the downwardly extending ribs 2c are, respectively, provided at the opposite sides of the locking projection 2b of the upper casing 2 as shown in FIGS. 7 and 8, flow of the rainwater, etc. directed to the opposite sides of the locking projection 2b as shown by the arrows b is blocked by the ribs 2c. Therefore, the rainwater, etc. flowing reversely from the drainage hole 1c into the lower casing 1 is prevented by the ribs 2c from penetrating into the upper casing 2, so that immersion of a bus bar, etc. in water is positively prevented.

As is clear from the foregoing description of the branch joint box of the present invention, a pair of the downwardly extending ribs having a height identical with that of the locking projection of the upper caring are, respectively, formed at the opposite sides of the locking projection of the upper casing. Thus, even if rainwater, etc. reversely flows from the drainage hole, etc. into the lower casing, flow of the rainwater, etc. directed to the opposite sides of the locking projection of the upper casing is blocked by the ribs and thus, water immersion in the upper casing can be prevented positively.

What is claimed is:

1. A branch joint box comprising a lower casing and an upper casing, the upper casing being fitted into the lower casing, a first locking projection formed on an inner surface of an outer peripheral wall of the lower casing, said first locking projection riding over a second locking projection formed on an outer surface of an outer peripheral wall of the upper casing so as to be brought into engagement with the second locking projection of the upper casing such that the upper and lower casings are locked to each other, and a pair of downwardly extending ribs being respectively formed at opposite sides of the second locking projection of the upper casing, said extending ribs having a height identical with the height of the second locking projection of the upper casing.

* * * * *